(12) United States Patent
Morrow

(10) Patent No.: US 7,437,512 B2
(45) Date of Patent: Oct. 14, 2008

(54) LOW POWER SEMI-TRACE INSTRUCTION/TRACE HYBRID CACHE WITH LOGIC FOR INDEXING THE TRACE CACHE UNDER CERTAIN CONDITIONS

(75) Inventor: Michael W. Morrow, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 412 days.

(21) Appl. No.: 10/788,725

(22) Filed: Feb. 26, 2004

(65) Prior Publication Data

US 2005/0193175 A1 Sep. 1, 2005

(51) Int. Cl.
*G06F 12/00* (2006.01)
*G06F 13/00* (2006.01)
(52) U.S. Cl. .................. 711/125; 711/129; 711/137
(58) Field of Classification Search ......... 711/125, 711/119, 129, 137; 712/233
See application file for complete search history.

(56) References Cited

U.S. PATENT DOCUMENTS

| 6,170,038 | B1 * | 1/2001 | Krick et al. ............. 711/125 |
| 6,473,331 | B1 * | 10/2002 | Takashima ............. 365/145 |
| 2002/0144101 | A1 * | 10/2002 | Wang et al. ............. 712/240 |
| 2004/0015675 | A1 * | 1/2004 | Kyker et al. ............. 711/207 |
| 2004/0088489 | A1 * | 5/2004 | Hironaka et al. ......... 711/131 |
| 2005/0125613 | A1 * | 6/2005 | Kim et al. ............. 711/125 |
| 2005/0132169 | A1 * | 6/2005 | Mates .................... 712/208 |

OTHER PUBLICATIONS

Rotenberg, E.; Bennett, S.; Smith, J.E., Trach cache: a low latency approach to high bandwidth instruction fetching, Microarchitecture, 1996. MICRO-29. Proceedings of the 29th Annual IEEE/ACM International Symposium on, 1996, pp. 24-34.*
Pending U.S. Appl. No. 10/750,256, filed Dec. 29, 2003 to Dennis M. O'Connor, et al.

* cited by examiner

*Primary Examiner*—Hong Kim

(57) ABSTRACT

A semi-trace cache combines elements and features of an instruction cache and a trace cache. An ICache portion of the semi-trace cache is filled with instructions fetched from the next level of the memory hierarchy while a TCache portion is filled with traces gleaned either from the actual stream of retired instructions or predicted before execution.

26 Claims, 3 Drawing Sheets

LOW POWER SEMI-TRACE INSTRUCTION/TRACE HYBRID CACHE WITH LOGIC FOR INDEXING THE TRACE CACHE UNDER CERTAIN CONDITIONS

Digital computers have cache memories for storing instructions. These memories use faster static memories as compared to the slower dynamic memories used for the computer's main memory. Through use of replacement algorithms, a relatively small cache memory compared to the size of the main memory provides a relatively high hit rate and consequently speeds up the flow of instructions to the execution unit of the computer. What is needed are improvements in cache memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
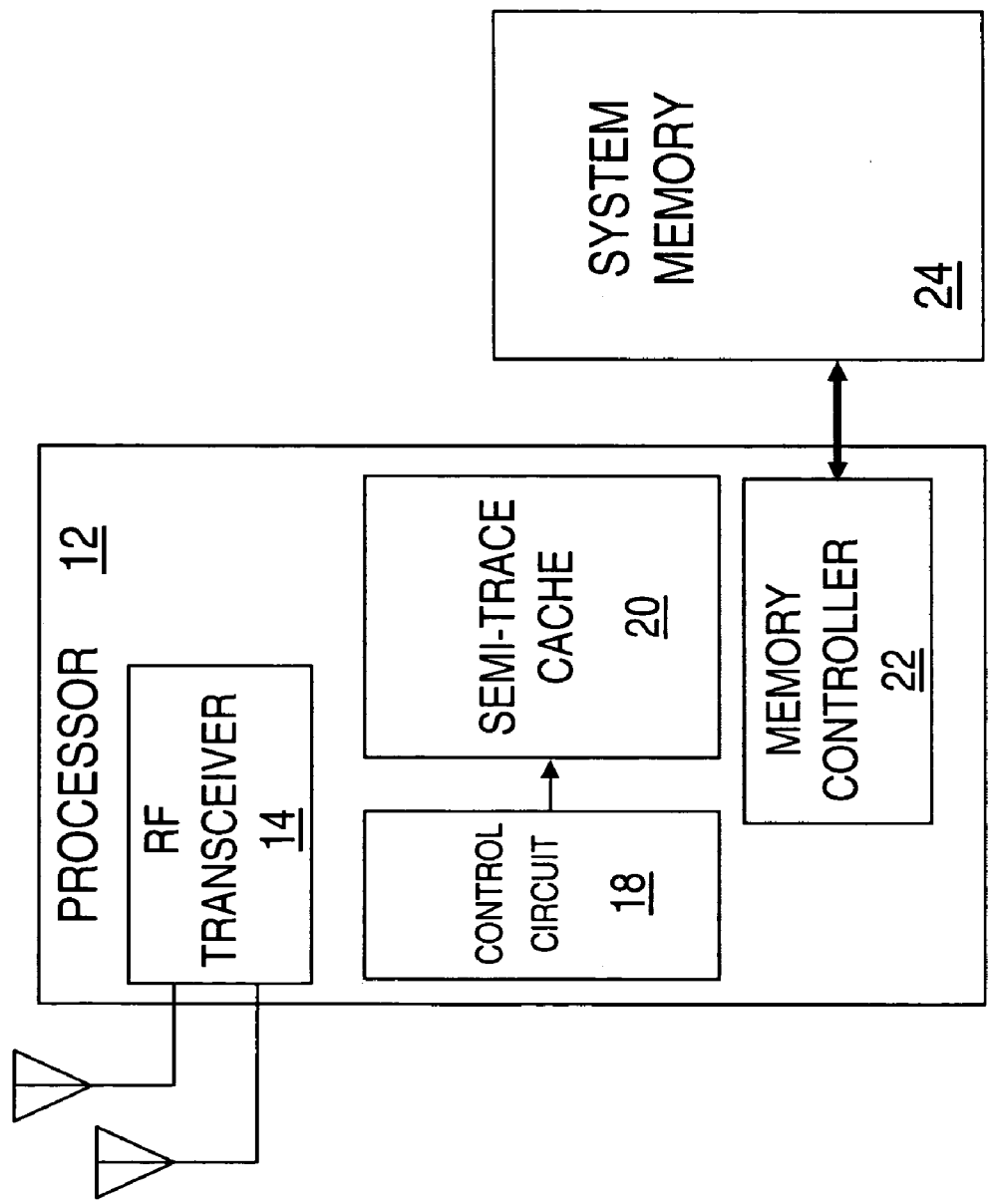
FIG. 1 illustrates a wireless device having an instruction cache and a trace cache combined into a semi-trace cache in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a wireless device 10 that includes a semi-trace cache 20 that combines features of an instruction cache with a trace cache in accordance with the present invention. In this embodiment, an RF transceiver 14 may be a stand-alone Radio Frequency (RF) integrated analog circuit, or alternatively, be embedded with a processor 12 as a mixed-mode integrated circuit. The received modulated signal is frequency down-converted, filtered, then converted to a baseband, digital signal. In accordance with the present invention, semi-trace cache 20 provides, in one cache structure, a storage array that fills lines with either contiguous instructions or with elements of a trace. Control circuit 18 provides addressing and enables the portions of instruction cache and trace cache within semi-trace 16. A memory controller 22 retrieves and processes current commands and is connected via address and control buses to a system memory 24.

Although the present invention is shown in a wireless device 10, it should be understood that other applications and products may use the invention. Embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive infotainment products. However, it should be understood that the scope of the present invention is not limited to these examples.

Figure 2:
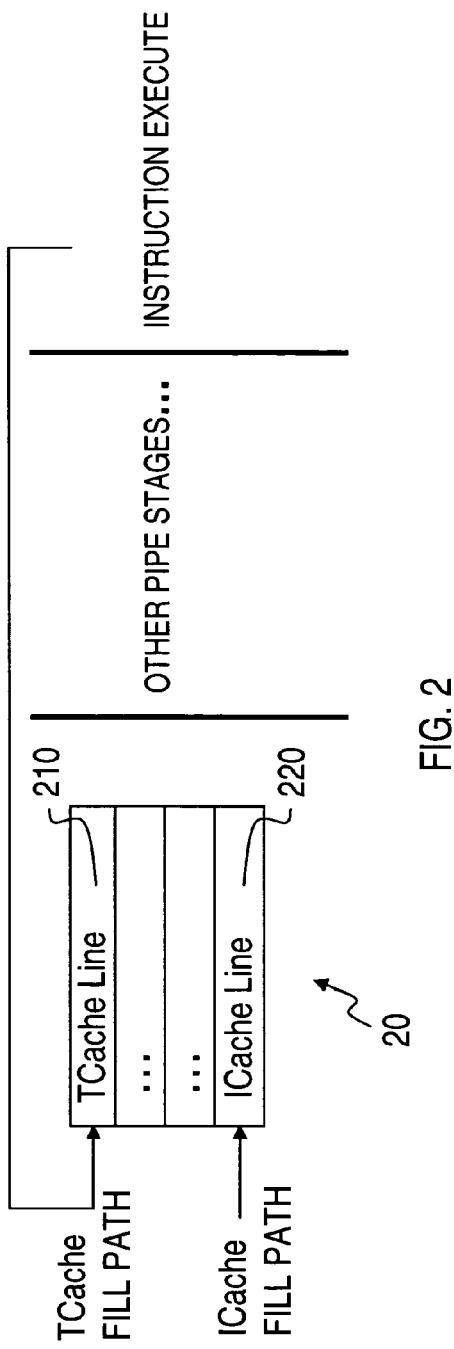
FIG. 2 is a diagram that illustrates elements of the instruction cache and the trace cache combined into a semi-trace cache.

FIG. 2 is a simplified diagram that illustrates both an instruction cache portion and a trace cache portion residing within one cache storage structure. In other words, semi-trace cache 20 has an instruction cache portion combined or intermingled with a trace cache portion. A prior art cache memory is organized by lines where the tag and index bits of an address point to an entire line of instructions and offset bits are used to select instructions from within the line. A prior art trace cache stores traces in lines of cache memory of instructions in a program order as defined by a running or executing program. It should be pointed out that in accordance with the present invention, semi-trace cache 20 combines elements and features of both the instruction cache and the trace cache in a single cache structure used in the instruction-fetch portion of processor 12.

Control circuit 18 controls the storage and retrieval of cached data words within semi-trace cache 20 having an array that may be either a single array or multiple arrays. Again, whereas prior art cache structures may dedicate one array to instruction cache and the other array to trace cache, the present invention physically intermingles features of both in either of the two arrays. Semi-trace cache 20 may be multi-way, or alternatively, semi-trace cache 20 may be segregated by way. Further, the TCache line size, i.e., TCache line 210, may be a multiple of the ICache line size, i.e., ICache line 220, although this is not a limitation of the present invention.

Referring to FIG. 2, TCache line 210 is in the trace cache portion and ICache line 220 is in the instruction cache portion of semi-trace cache 20. The term ICache denotes portions of semi-trace cache 20 used as an instruction cache and the term TCache denotes portions that are used as a trace cache. Note that the number of lines in the ICache portion and the TCache portion may dynamically change and the ICache and TCache portions may migrate within semi-trace cache 20 as time progresses. Also note that the ICache portions and the TCache portions may be consulted in parallel, but only one may supply instructions at any time.

Again, the TCache portion stores instructions in program order rather than in address order and contains a complete line of usable instructions (in the case of a correct prediction).

Thus, the TCache portion is filled with traces gleaned either from the actual stream of retired instructions, or instructions predicted before execution. Note that the TCache portion is only indexed when processor 12 executes certain instructions such as, for example, a branch, a jump, a call, a return, etc. (see FIG. 4). Accordingly, TCache line 210 may contain non-contiguous instructions from an instruction stream having, for example, branches that include instructions that start at a branch target and potentially continue through other taken branches. Consequently, a plurality of instructions including instructions crossing a predicted branch boundary may be fetched from the TCache portion of semi-trace cache 20 with only one address/access. Traces may be built using a line buffer (or fill-unit) that records instructions as they are retired from the execution core and the instructions may be inserted into semi-trace cache 20 when a trace end-condition is encountered.

A selected line of semi-trace cache 20 supplies instructions out of it in sequence, which for the TCache results in a program-order stream of instructions. When the TCache portion is supplying instructions, indexing logic is not used to look-up either ICache lines or TCache lines. Note that the selective use of the indexing logic reduces power compared to looking up the cache every cycle. Further note an appropriately-sized TCache portion within semi-trace cache 20 may supply, for example, more than one-half of a program's instructions, so by not using indexing logic the power may be reduced accordingly.

Again, a selected line of semi-trace cache 20 supplies instructions out of it in sequence, which for the ICache portions result in some instructions in program order until a branch is encountered. The ICache is filled with instructions fetched from the next level of the memory hierarchy. Semi-trace cache 20 may be filled from a buffer that avoids reading/writing the cache simultaneously.

Figure 3:
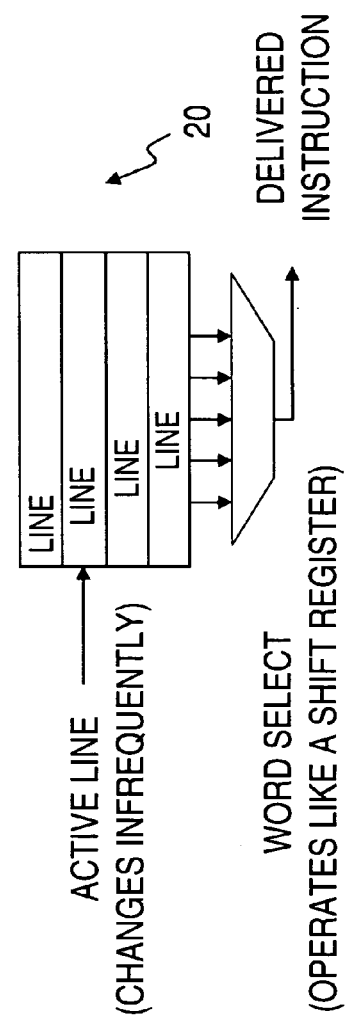
FIG. 3 is a diagram that illustrates reading from the semi-trace cache.
Figure 4:
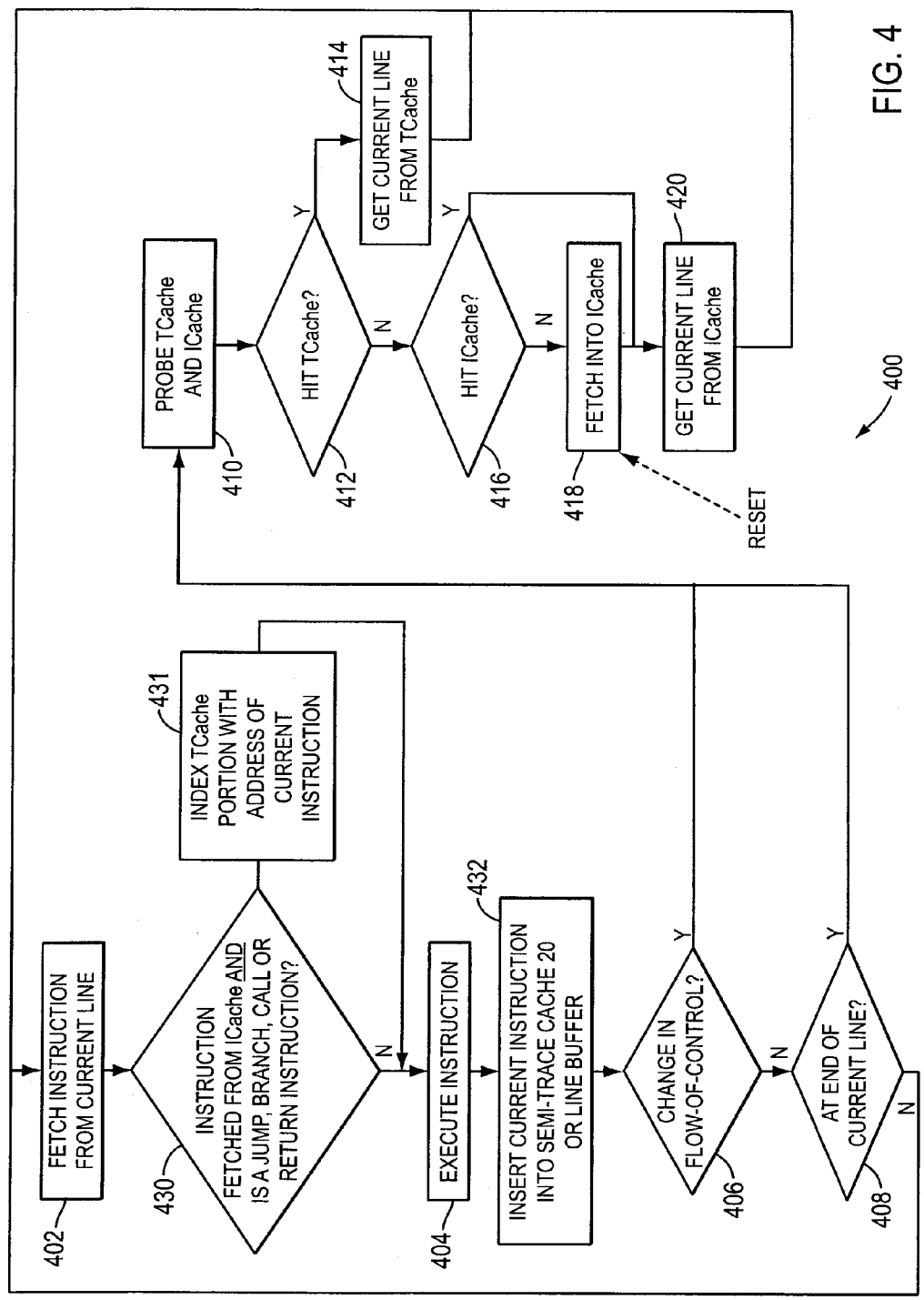
FIG. 4 is a flow diagram that shows functional operation of the semi-trace cache.

FIG. 3 is a diagram that illustrates reading from the semi-trace cache and FIG. 4 is a flow diagram 400 that shows functional operation of semi-trace cache 20. As shown in FIG. 4, block 402 shows that an instruction is fetched from the current line of semi-trace cache 20. At block 430, a determination is made whether the instruction is fetched from ICache and is a jump, branch, call, or return instruction. If the conditions of block 430 are met, the TCache portion is indexed with the address of the current instruction at block 431. The fetched instruction is executed by processor 12 as indicated by block 404. At block 432, the current instruction is inserted into semi-trace cache 20 or a line buffer as discussed above. In block 406 a determination is made as to whether the executed instruction causes processor 12 to take a change in the flow-of-control. Different actions may be taken depending on whether processor 12 is running from the TCache portion or the ICache portion. For instance, when running from the TCache portion a change in flow-of-control may occur when a branch is mispredicted or an end of the line is reached. If there is no change in flow, then in block 408, a check is made to determine if the last instruction in the current line was fetched and executed. If the last instruction was not fetched then control is looped back to block 402.

When the end of a line is reached in either the TCache or ICache portion, control logic decides where to get the next line. As shown in block 410, the system has the address of the next instruction and decides whether to use the TCache or the ICache portion. For instance, the TCache portion may associate a "next address" with each line that allows the next line to be ready before the current line is completely fetched. This chaining of cache lines may lead to a more efficient implementation. Further, semi-trace cache 20 avoids activating a line every cycle. By holding the line-enable constant and pulling out sequential elements, the cache saves the energy normally used to index the cache.

Further, returning to block 406, if the address is the result of an instruction such as a branch target, then both the TCache and the ICache will be searched in block 410. In block 412, the address is checked as to whether it is found in the TCache and if a hit is indicated, then that line will be used (block 414) and the TCache searched (returned to block 402). On the other hand, if that address is only found in the ICache, then block 416 indicates that the ICache line is used (see block 420). If neither the TCache nor the ICache line has the address, then it is considered a miss and block 418 shows an ICache line will be filled from memory such as, for example, an L2 cache (not shown) or system memory 24 (see FIG. 1).

By now it should be apparent that a semi-trace cache that combines elements of an instruction cache and a trace cache improves instruction fetch throughput while allowing a single fetched line to cross basic-block boundaries. The semi-trace cache may be used to deliver a high-quality instruction stream with low power.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A storage device, comprising:
   a cache array having cache lines filled with contiguous instructions in an instruction cache (ICache) portion that is adjacent to a trace cache (TCache) portion wherein:
   cache lines are filled with elements of a trace; and
   neither the ICache portion nor the TCache portion are looked-up when the TCache portion is supplying instructions; and
   an instruction indexing logic, wherein
   the indexing logic is not used for either the ICache portion or TCache portion when the TCache portion is supplying instructions; and
   the TCache portion is indexed only when a processor executes one of:
   a branch instruction;
   a jump instruction;
   a call instruction; and
   a return instruction.

2. The storage device of claim 1 wherein the ICache portion is looked-up using the indexing logic when the TCache portion is not supplying instructions.

3. The method of claim 1, wherein the ICache and TCache portions may migrate within the cache as time progresses.

4. The storage device of claim 1 wherein a line in the TCache portion is indexed when a branch instruction is executed.

5. The storage device of claim 1 wherein the TCache portion contains non-contiguous instructions from an instruction stream.

6. A system, comprising:
   a processor;
   at least one antenna to receive modulated signals and supply a signal to the processor;
   a cache having in one array both an instruction cache (ICache) portion and a trace cache (TCache) portion, where a line in the TCache portion is not looked-up when the TCache portion is supplying instructions; and
   an instruction indexing logic, wherein the indexing logic is not used for either the ICache portion or TCache portion when the TCache portion is supplying instructions; and the TCache portion is indexed only when the processor executes one of:
a branch instruction;
a jump instruction;
a call instruction; and
a return instruction.

7. The system of claim 6, wherein the TCache line size is a multiple of the ICache line size.

8. The system of claim 6 wherein the ICache portion is looked-up using the indexing logic when the TCache portion is not supplying instructions.

9. The system of claim 6, wherein the ICache and TCache portions may migrate within the cache as time progresses.

10. A method, comprising:
intermingling cache lines in one array of a cache where a first cache line in a trace cache (TCache) portion is physically adjacent a second cache line in an instruction cache (ICache) portion and selecting the TCache or the ICache portion based on an address of the next instruction; and
using an instruction indexing logic to select some instructions, wherein
the indexing logic is not used for either the ICache portion or TCache portion when the TCache portion is supplying instructions; and
the TCache portion is indexed only when a processor executes one of:
a branch instruction;
a jump instruction;
a call instruction; and
a return instruction.

11. The method of claim 10, further including:
dynamically changing a number of lines in the ICache portion and the TCache portion.

12. The method of claim 10, further including:
dynamically altering a size of the ICache portion and the TCache portion in the one array as time progresses.

13. The computer system of claim 10, further including:
supplying a program-order stream of instructions from each cache line in the TCache portion.

14. The computer system of claim 10, further including:
supplying instructions in program order from cache lines in the ICache portion until a branch is encountered.

15. The computer system of claim 10, further including:
associating a next address with the first cache line in the TCache portion to allow a next line to be ready before a current line is completely fetched.

16. A method comprising:
filling an array with instruction cache (ICache) cache lines mixed with trace cache (TCache) cache lines where an allocated proportion of ICache cache lines to TCache cache lines is dynamically changing with time and neither the ICache portion nor the TCache portion are looked-up when the TCache portion is supplying instructions; and
using an instruction indexing logic to select some instructions, wherein
the indexing logic is not used for either the ICache portion or TCache portion when the TCache portion is supplying instructions; and
the TCache portion is indexed only when a processor executes one of:
a branch instruction;
a jump instruction;
a call instruction; and
a return instruction.

17. The method of claim 16, comprising:
using an address of a next instruction when an end of a cache line is reached to determine use of the ICache cache lines or the TCache cache lines.

18. The method of claim 16, comprising:
searching both the ICache cache lines and the TCache cache lines when an address is a result of a branch target.

19. The method of claim 16, comprising:
using the TCache cache lines when an address is found in the TCache cache lines.

20. The method of claim 19, comprising:
using the ICache cache lines when the address is found in the ICache cache lines and not in the TCache cache lines.

21. The method of claim 16, wherein the ICache portion is looked-up using the indexing logic when the TCache portion is not supplying instructions.

22. The system of claim 6, wherein the at least one antenna comprises a Radio Frequency (RF) transceiver.

23. The system of claim 6, further comprising a control circuit to control the storage and retrieval of data words stored in the cache.

24. The method of claim 10, wherein the ICache portion is looked-up using the indexing logic when the TCache portion is not supplying instructions.

25. The method of claim 10, wherein the TCache line size is a multiple of the ICache line size.

26. The method of claim 10, wherein the ICache and TCache portions may migrate within the cache as time progresses.

* * * * *